(12) United States Patent
Archibald et al.

(10) Patent No.: US 6,896,212 B2
(45) Date of Patent: May 24, 2005

(54) METHOD OF PRODUCING FINE SOLID PARTICLES AND DISPERSIONS

(75) Inventors: Vere Orland Archibald, North Wales, PA (US); Richard Shu-Hua Wu, Fort Washington, PA (US)

(73) Assignee: Rohm and Haas Company, Philadelphia, PA (US)

( * ) Notice: Subject to any disclaimer, the term of this patent is extended or adjusted under 35 U.S.C. 154(b) by 102 days.

(21) Appl. No.: 10/655,266

(22) Filed: Sep. 4, 2003

(65) Prior Publication Data

US 2004/0251331 A1 Dec. 16, 2004

Related U.S. Application Data

(60) Provisional application No. 60/408,450, filed on Sep. 5, 2002.

(51) Int. Cl.$^7$ ............................................... B02C 17/16
(52) U.S. Cl. ............................ 241/21; 241/29; 241/184
(58) Field of Search ........................... 241/21, 184, 30, 241/172, 29, 152.2

(56) References Cited

U.S. PATENT DOCUMENTS

| | | |
|---|---|---|
| 3,593,927 A | 7/1971 | Neill et al. |
| 3,770,476 A | 11/1973 | McKay et al. |
| 4,226,634 A | 10/1980 | Dimroth et al. |
| 4,665,107 A | 5/1987 | Micale et al. |
| 5,300,394 A | 4/1994 | Miller et al. |
| 5,478,705 A * | 12/1995 | Czekai et al. ................ 430/449 |
| 5,500,331 A * | 3/1996 | Czekai et al. ................ 430/449 |
| 5,662,279 A | 9/1997 | Czekai et al. |
| 5,719,204 A | 2/1998 | Beach et al. |
| 5,854,311 A | 12/1998 | Richard et al. |
| 5,891,231 A | 4/1999 | Gnerlich et al. |
| 5,902,711 A * | 5/1999 | Smith et al. ........... 430/137.14 |
| 5,958,129 A | 9/1999 | Urban et al. |
| 5,969,002 A | 10/1999 | Kijlstra et al. |
| 6,267,807 B1 | 7/2001 | Harshbarger et al. |
| 6,328,393 B1 | 12/2001 | Lin et al. |
| 6,604,698 B2 * | 8/2003 | Verhoff et al. ................. 241/21 |

FOREIGN PATENT DOCUMENTS

| | | |
|---|---|---|
| DE | 3337615 A | 4/1985 |
| EP | 286976 | 4/1987 |
| EP | 0684507 A | 11/1995 |
| EP | 0684519 A | 11/1995 |
| JP | 2000290578 | 4/1999 |

* cited by examiner

*Primary Examiner*—Mark Rosenbaum
(74) *Attorney, Agent, or Firm*—Karl Stauss

(57) ABSTRACT

A method of using polymeric grinding media to produce fine solid particles or fine solid dispersions in liquid, such as pigment dispersions for inks, is provided. The method of the present invention limits packing and plugging problems associated with polymeric media to allow efficient milling operation.

5 Claims, No Drawings

METHOD OF PRODUCING FINE SOLID PARTICLES AND DISPERSIONS

CROSS REFERENCE TO RELATED PATENT APPLICATIONS

This is a non-provisional application of prior pending U.S. provisional application Ser. No. 60/408,450 filed Sep. 5, 2002.

This invention relates to a method of producing fine solid particles or fine solid dispersions in liquid, such as pigment dispersions. More specifically, this invention relates to a method of using polymeric grinding media to produce fine solid particles or fine solid dispersions.

Fine solid dispersions such as pigment dispersions in water are made by milling of pigments, dispersant, water and milling media in a high energy media mill such as a Netzsch brand zeta mill or a Premier brand super mill. In such milling applications, milling media are selected from a variety of dense materials such as steel, ceramic or glass. Most common media are ceramic media such as Yttria stabilized Zirconium oxide, including YTZ® media from Tosoh in Japan, zirconia silicate and zirconium-aluminum oxide. Common media sizes are from 0.1 mm to 3.0 mm in diameter. Such grinding media are typically dense and hard, with densities varying between 5.5 and 7.7 g/ml and with a Mohs hardness between 7 and 9. A material's Mohs' hardness value indicates the materials resistance to scratching. Diamond has a maximum Mohs' hardness of 10 and Talc has a Mohs' hardness of 1.

These media will introduce heavy metals such as Yttria, Zirconia, Nickel and Iron into the dispersions. To combat heavy metal contamination, some mill chambers are coated with a polyurethane coating that reduces the nickel and iron content from the stainless steel mill chamber and some metal content from the grinding media. However, fine particles and fine particle dispersions made in such mills will not be completely heavy metal free with these media types, and the heat transfer capacity of the mill chamber will be reduced upon coating it.

Another method of combating heavy metal contamination is to use polymeric beads as the grinding media since such media do not introduce heavy metals and eliminate the need for coating the chamber with polyurethane, thereby enabling the use of the chamber body for heat transfer capacity. Polymeric media is light, with densities typically between 1.1 and 1.6 g/ml.

U.S. Pat. Nos. 5,478,705 and 5,500,331 to Eastman Kodak Company discloses the use of polymeric resins as grinding media, however, mills utilizing polymeric media suffer from hydrodynamic packing around the down stream screen. This hydrodynamic packing is very sensitive to the particle pre-grind quality, as well as agitator rotational speeds and flow rates. A lot of large agglomerated pigment particles in the pre-grind, whose size can be as big as one half the grinding media, are present at the early grinding stage. When ten percent (10%) by mass of the agglomerated particles are ten percent (10%) or greater of the polymeric grinding media bead size, then the mill is prone to packing and plugging at the down flow screen. This problem is particularly pronounced at the very short residence times needed to make a dispersion with a narrow particle size distribution.

One method of overcoming the packing and plugging problem is to use multiple milling steps in series, whereby the operator starts with large grinding media for large particles and each subsequent milling operation utilizes a smaller grinding media particle size to "step down" the size of the ground particle in each milling step. This process is expensive and time consuming, requiring the use of multiple mill chambers. Another approach of overcoming the packing and plugging problem is to clean out the filter screen frequently. This method is time consuming and expensive, resulting in breaks between milling operations while the filter is changed or cleaned.

The problem addressed by the present invention is to provide a method of utilizing polymeric grinding media in a single milling operation while limiting packing and plugging problems associated with such media. We have found that by feeding particles into a mill loaded with polymeric grinding media wherein the mill has an entry channel capable of pre-shearing the particles, packing and plugging of the mill is limited.

The present invention provides a method of producing fine solid particles comprising: (a) loading a grinding mill with polymeric grinding media; and (b) feeding agglomerated particles into the grinding mill wherein the grinding mill has an entry channel that pre-shears the agglomerated particles and at least ten percent (10%) by mass of the agglomerated particles are at least ten percent (10%) of the polymeric grinding media bead size.

Surprisingly, the pre-shearing of particles in a mill entry channel enables an operator to grind large agglomerated particles in relation to the size of the polymeric grinding media, without packing and plugging the mill. This improvement provides for a simple single step milling operation.

Particle size of the pre-grind agglomerated particles is a volume or mass based figure, not a number average. In this way, it is possible to have a lot of small particles and a only a few very large particles, such that the volume or mass average of the large particles is large in comparison to the polymeric bead size. Pre-grind agglomerated particle size may be examined via any commercially available device, such as an AccuSizer™ 788 by Particle Sizing Systems of Santa Monica, Calif., U.S.A. which uses a laser counting system to read particles sizes above 0.5 microns to about 500 microns.

The milling media can comprise particles, preferably substantially spherical in shape, e.g., beads, consisting essentially of the polymeric resin. Alternatively, the milling media can comprise particles comprising a core having a coating of the polymeric resin adhered thereon.

In general, polymeric resins suitable for use herein are chemically and physically inert, substantially free of metals, solvents and monomers, and of sufficient hardness and friability to enable them to avoid being chipped or crushed during milling. Suitable polymeric resins include cross linked polystyrenes, such as polystyrene cross linked with divinyl benzene, styrene copolymers, polycarbonates, polyacetals, such as Delrin™, vinyl chloride polymers and copolymers, polyurethanes, polyamides, poly (tetrafluoroethylenes), e.g., Teflon™, and other fluoropolymers, high density polyethylenes, polypropylenes, cellulose ethers and esters such as cellulose acetate, polyacrylates, such as polymethylmethacrylate, polyhydroxymethacrylate and polyhydroxyethyl acrylate, silicone containing polymers such as polysiloxanes and the like. The polymer can be biodegradable. Exemplary biodegradable polymers include poly(lactides), poly(glycolide), copolymers of lactides and glycolide, polyanhydrides, poly (hydroxyethyl methacrylate), poly(iminocarbonates), poly (N-acylhydroxyproline)esters, poly (N-palmitoyl hydroxyproline esters, ethylene-vinyl acetate copolymers, poly(orthoesters), poly(caprolactones), and poly(phosphazenes).

The polymeric resin can have a wide array of densities, as known in the art, typically ranging from 0.8 to 3.0 g/cm$^3$. Higher density resins are preferred as they provide more efficient particle size reduction. The media can have a wide array of sizes, as known in the art, typically ranging in size from 0.1 to about 4 mm. For fine milling, the particles preferably are from 0.2 to 2 mm, more preferably, 0.25 to 1 mm in size.

The core material can be selected from materials known to be useful as milling media when fabricated as spheres or particles. Suitable core materials include zirconium oxides (such as 95% zirconium oxide stabilized with magnesia or yttrium), zirconium silicate, glass stainless steel, titania, alumina, ferrite and the like. Preferred core materials have a density greater than 2.5 g/cm$^3$. The selection of high density core materials facilitates efficient particle size reduction.

The cores can be coated with the polymer resin by techniques known in the art. Suitable techniques include spray coating, fluidized bed coating, and melt coating. Adhesion promoting or tie layers can optionally be provided to improve the adhesion between the core material and the resin coating. The adhesion of the polymer coating to the core material can be enhanced by treating the core material to adhesion promoting procedures, such as roughening the core surface, corona discharge treatment, and the like.

The wet milling process can be practiced in conjunction with a liquid dispersion medium and surface modifier such as described in U.S. Pat. No. 5,145,684 and European published application No. 498,482. Useful liquid dispersion media include water, aqueous salt solutions, ethanol, butanol, hexane, glycol and the like. The surface modifier can be selected from known organic and inorganic materials such as described is U.S. Pat. No. 5,145,684 and can be present in an amount of 0.1–90%, preferably 1–80% by weight based on the total weight of the dry particles.

Milling can take place in any suitable mill having an entry channel that pre-shears the particles, whether as part of its initial design or as retrofitted. Suitable mill is a media mill, including in various formations, such as a horizontal or vertical mill.

The preferred proportions of the milling media, the solid (or pigment) and the liquid dispersion medium and surface modifier present in the milling vessel can vary with wide limits and depends for example of the particular solid (or pigment) selected, the size and density of the milling media, the type of mill selected etc. The process can be carried out in a continuous, batch or semi-batch mode. In high energy media mills, it can be desirable to fill 70–100% of the volume of the milling chamber with milling media. The total milling time can vary widely and depends primarily upon the particular solids or pigments, mechanical means and residence conditions selected, the initial and desired particle size and so forth. Total residence times of less than about 4 hours are generally required using high energy media mills.

After milling is completed, the liquid dispersion, is pumped through a built in screen in the milling machine. The media will remain in the mill and later discharges from the mill for further cleaning.

The process can be practiced with a wide variety of compounds including pigments and including biologically active organic compounds. In wet milling, the compound (solid) useful in the dispersion should be poorly soluble and dispersible in at least one liquid medium. By "poorly soluble," it is meant that the compound useful in imaging elements has a solubility in the liquid dispersion medium, e.g., water, of less that about 10 mg/ml, and preferably of less than about 1 mg/ml. The preferred liquid dispersion medium is water, although other suitable liquids may be used.

Particles of this invention, particularly pigments, may be used as dispersions for use in inks, such as for ink jet inks. An example is for aqueous based pigment dispersions used in formulating ink jet inks. There is no limitation with respect to the pigments that may be employed in this invention. Any of the commonly employed organic or inorganic pigments may be used. An illustrative list of the pigments which may be employed in this invention includes azo pigments such as condensed and chelate azo pigments, and polycyclic pigments such as phthalocyanines, anthraquinones, quinacridones, thioindigoids, isoindolinones, and quinophthalones. Still other pigments which may be employed include, for example, nitro pigments, daylight fluorescent pigments, carbonates, chromates, titanium oxides, zinc oxides, iron oxides and carbon black. Preferred pigments employed in this invention include carbon black and pigments capable of generating a cyan, magenta, yellow, blue, green and red ink. The pigments employable in this invention may be prepared via conventional techniques, are typically commercially available, and often listed as, for example, a specific yellow, orange, red, blue, green, violet or black on the Colour Index. The final pigment mean particle size normally is in the range of 10 to 300 nm and more preferably between 20 to 200 nm. This kind of fine dispersion will have excellent pigment sedimentation resistance during ink storage and will not clot the narrow channel of a printing head.

The invention in some of its embodiments will now be further described by reference to the following examples:

EXAMPLE 1

Preparation of Pre-grind

A pre-grind pigment dispersion mixture is prepared by wetting a powdered pigment into an aqueous dispersant of an acrylic copolymer resin solution in a vessel with a 45 pitched bladed turbine agitator at approximately 50 to 350 RPM.

First, the water is charged into the vessel, then the known amount of acrylic copolymer solution is charged into the vessel under agitation. Finally the known amount of pre weighed pigment is charged into the vessel slowly under agitation and mixed for 0.75 to 2 hours. This mixture is left untreated by a high shear device, such as a line rotor and stator high shear (3500 RPM) device discussed in EP1054020A2. This pre-grind is greater than 30% solids and 44% of this solid material has a volume or weight fraction with a mean particle diameter greater than 100 microns, as measured by the AccuSizer™ 788. Moreover, 52% of the solids in the pre-grind has a volume or weight fraction with a mean particle diameter greater than 50 microns, as measured by the AccuSizer™ 788. The maximum solid particle size is 180 microns.

EXAMPLE 2

Grinding with High Shear Entry Channel

The pre-grind mixture of Example 1 is pumped then passed through a narrow channel incorporated into a Drais Advantis™ brand one liter vertical mill, exposing the mixture to a region of high shear. The Drais Advantis™ mill is produced by Draiswerke, Inc. of Mahwah, N.J., U.S.A. The dispersion passes through this narrow high shear channel without grinding media before entering the main milling chamber that is loaded with polymeric (polystyrene) beads with a range of particle diameters of 300 to 600 microns (mean 450 microns). The grinding media loading is ninety percent (90%). The fast dispersion flow rate is used so that the mean residence time of liquid in the mill is 8.5 seconds. After passing through the mill, this mixture returns to the agitated vessel and the process steps are repeated until the pigment reaches the target particle size. No plugging problems occur around the mill screen throughout the entire milling process.

When the weight average particle size of the pigment reaches the target value of 90–110 nm as measured by a Honeywell MicroTrac UPA instrument, the milling process is terminated. This dispersion, after filtration, can be used as a raw material in formulating inks, including inks for ink jet printing.

The mean residence time per pass through the mill is defined as:

Tr=Vr (in liter)/ liquid dispersion flow rate (in liter per second); wherein

Vr=free volume of mill that was not occupied by the grinding media

EXAMPLE 3

Grinding Without High Shear Entry Channel

The pre-grind mixture of Example 1 is pumped then passed through a Netzsch Labstar brand 0.53 liter horizontal mill, without a narrow high shear entry channel. The Netzsch Labstar mill is produced by Netzsch-Feinmahltechnik GmbH of Selb, Germany. The milling chamber is loaded with plastic (polystyrene) beads with a range of particle diameters of 300 to 600 microns (mean 450 microns). The grinding media loading is about seventy three percent (73%). Normally higher media loading results in the media plugging around the mill screen. The slow dispersion flow rate is used so that the mean residence time is 90 seconds. Normally faster flow rates (shorter mean residence time), results in severe media plugging around the mill screen. After passing the mill this mixture returns to the agitated vessel and the process steps are repeated until the pigment reaches the target particle size.

Large agglomerated particles bind with the media to pack around the separating screen of the mill, resulting in a high pressure drop across the mill and requiring the mill to be shut down. The mill is disassembled, the screen is cleaned, the mill is reassembled and then the milling process is restarted. This screen cleaning step will be conducted several times before the mill process runs without packing.

When the weight average particle size of the pigment reaches the target value of 90–110 nm as measured by a Honeywell MicroTrac UPA instrument, the milling process is terminated. This dispersion, after filtration, can be used as a raw material in formulating inks, including inks for ink jet printing.

We claim:

1. A method of producing fine solid particles comprising:
   loading a grinding mill with polymeric grinding media; and
   feeding agglomerated particles into the grinding mill wherein the grinding mill has an entry channel that pre-shears the agglomerated particles and at least ten percent (10%) by mass of the agglomerated particles are at least ten percent (10%) of the polymeric grinding media bead size.

2. The method of claim 1 wherein the fine solid particles and the agglomerated particles are dispersed in a liquid medium.

3. The method of claim 1 wherein the fine solid particles are selected from the group consisting of carbon black, organic pigments, inorganic pigments, biologically active organic compounds and combinations thereof.

4. The method of claim 1 wherein the polymeric grinding media is selected from the group consisting of poly(styrene), cross linked poly(styrene), polyurethanes, polyamides, poly(tetrafluoroethylenes), fluoropolymers, high density polyethylenes, polypropylenes, cellulose ethers, cellulose acetate, polyacrylates, polysiloxanes, biodegradeable polymers and combinations thereof.

5. The method of claim 1 wherein more than half of the agglomerated particles, by mass, have a mean particle size of greater than 50 microns.

* * * * *